(12) United States Patent
Momchilov (10) Patent No.: US 11,165,871 B2
(45) Date of Patent: Nov. 2, 2021

(54) COMPUTER SYSTEM PROVIDING CONTEXT-BASED SOFTWARE AS A SERVICE (SAAS) APPLICATION SESSION SWITCHING AND RELATED METHODS

(71) Applicant: CITRIX SYSTEMS, INC., Fort Lauderdale, FL (US)

(72) Inventor: Georgy Momchilov, Parkland, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 63 days.

(21) Appl. No.: 16/264,830

(22) Filed: Feb. 1, 2019

(65) Prior Publication Data

US 2020/0252468 A1 Aug. 6, 2020

(51) Int. Cl.
*H04L 29/08* (2006.01)
*H04L 29/06* (2006.01)

(52) U.S. Cl.
CPC ............ *H04L 67/148* (2013.01); *H04L 67/18* (2013.01); *H04L 67/306* (2013.01); *H04L 67/42* (2013.01)

(58) Field of Classification Search
CPC ..... H04L 67/148; H04L 67/18; H04L 67/306; H04L 67/42; H04L 12/24
See application file for complete search history.

(56) References Cited

U.S. PATENT DOCUMENTS

| | | | |
|---|---|---|---|
| 8,613,070 B1 | 12/2013 | Borzycki et al. | |
| 8,650,303 B1 | 2/2014 | Lang et al. | |
| 8,719,898 B1 | 5/2014 | Barton et al. | |
| 8,850,010 B1 * | 9/2014 | Qureshi | H04L 41/0816 709/225 |
| 9,159,082 B2 * | 10/2015 | Sobotka | G06F 3/0482 |
| 9,176,744 B2 | 11/2015 | Lee | |
| 9,538,345 B2 | 1/2017 | Sah et al. | |
| 2010/0318999 A1 * | 12/2010 | Zhao | G06F 9/5044 718/104 |
| 2013/0060842 A1 * | 3/2013 | Grossman | H04L 12/4641 709/203 |
| 2014/0040977 A1 * | 2/2014 | Barton | H04L 63/20 726/1 |

(Continued)

FOREIGN PATENT DOCUMENTS

| | | | | |
|---|---|---|---|---|
| EP | 3171271 | | 5/2017 | |
| WO | WO-2015105499 | * | 7/2015 | ............... G06F 9/50 |

OTHER PUBLICATIONS

U.S. Appl. No. 15/971,157, filed May 4, 2018; Van Rotterdam et al.
(Continued)

*Primary Examiner* — Lance Leonard Barry
*Assistant Examiner* — Timothy Sowa
(74) *Attorney, Agent, or Firm* — Allen, Dyer, Doppelt + Gilchrist, PA (57) ABSTRACT

A computer system may include a client computing device configured to run a native session of a Software as a Service (SaaS) application. The system may further include a server configured to run a hosted session of the SaaS application for the client computing device. The client computing device and the server may cooperate to switch between the native session of the SaaS application and the hosted session of the SaaS application based upon a context associated with the client computing device.

20 Claims, 11 Drawing Sheets

(56) References Cited

U.S. PATENT DOCUMENTS

| | | | | |
|---|---|---|---|---|
| 2014/0108538 A1* | 4/2014 | Borzycki | ............ | G06F 21/6218 |
| | | | | 709/204 |
| 2014/0304326 A1* | 10/2014 | Wesley | .................. | H04L 67/10 |
| | | | | 709/203 |
| 2014/0330990 A1* | 11/2014 | Lang | ..................... | H04L 63/107 |
| | | | | 710/14 |
| 2014/0344420 A1* | 11/2014 | Rjeili | ...................... | H04L 43/04 |
| | | | | 709/220 |
| 2014/0344446 A1* | 11/2014 | Rjeili | ...................... | H04L 43/04 |
| | | | | 709/224 |
| 2015/0088978 A1* | 3/2015 | Motukuru | ............... | H04L 67/02 |
| | | | | 709/203 |
| 2015/0188779 A1* | 7/2015 | McCanne | ............... | H04L 63/10 |
| | | | | 709/203 |
| 2015/0271013 A1* | 9/2015 | Singh | ................. | H04L 12/1813 |
| | | | | 709/220 |
| 2016/0092348 A1* | 3/2016 | Straub | ................ | G06F 11/3684 |
| | | | | 717/124 |
| 2017/0339250 A1* | 11/2017 | Momchilov | ........ | G06F 9/45558 |

OTHER PUBLICATIONS

U.S. Appl. No. 16/156,256, filed Oct. 10, 2018; Van Rotterdam et al.

* cited by examiner

COMPUTER SYSTEM PROVIDING CONTEXT-BASED SOFTWARE AS A SERVICE (SAAS) APPLICATION SESSION SWITCHING AND RELATED METHODS

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

Software as a Service (SaaS) is a cloud computing approach to software delivery by which software applications are centrally hosted in the cloud and provided on a subscription basis to users. SaaS applications are offered for numerous areas, including business, accounting, and even gaming applications. SaaS applications are typically accessed on client devices with a thin client via a browser program.

SUMMARY

A computer system may include a client computing device configured to run a native session of a Software as a Service (SaaS) application. The system may further include a server configured to run a hosted session of the SaaS application for the client computing device. The client computing device and the server may cooperate to switch between the native session of the SaaS application and the hosted session of the SaaS application based upon a context associated with the client computing device.

In one example implementation, the context associated with the client computing device may correspond to a location of the client computing device. In some embodiments, the client computing device may be associated with a user account having a plurality of different personas, and the context associated with the client computing device may correspond to an active persona from among the plurality of different personas. In another example implementation the context may correspond to a type of transaction requested by the SaaS application. In still further implementations, the context may correspond to a security risk level associated with an operation being performed by the SaaS application.

Furthermore, the context associated with the client computing device may correspond to a latency associated with the hosted session of the SaaS application. In another example, the client computing device may include at least one input device, and the context associated with the client computing device may correspond to a call to use the at least one input device by the SaaS application. More particularly, the at least one input device may comprise at least one of a camera, a microphone, and an accelerometer. Additionally, the context associated with the client computing device may correspond to a processing level associated with an operation being performed by the SaaS application.

A related method may include running a native session of a SaaS application at a client computing device, and running a hosted session of the SaaS application for the client computing device at a server. The method may further include switching between the native session of the SaaS application and the hosted session of the SaaS application based upon a context associated with the client computing device.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
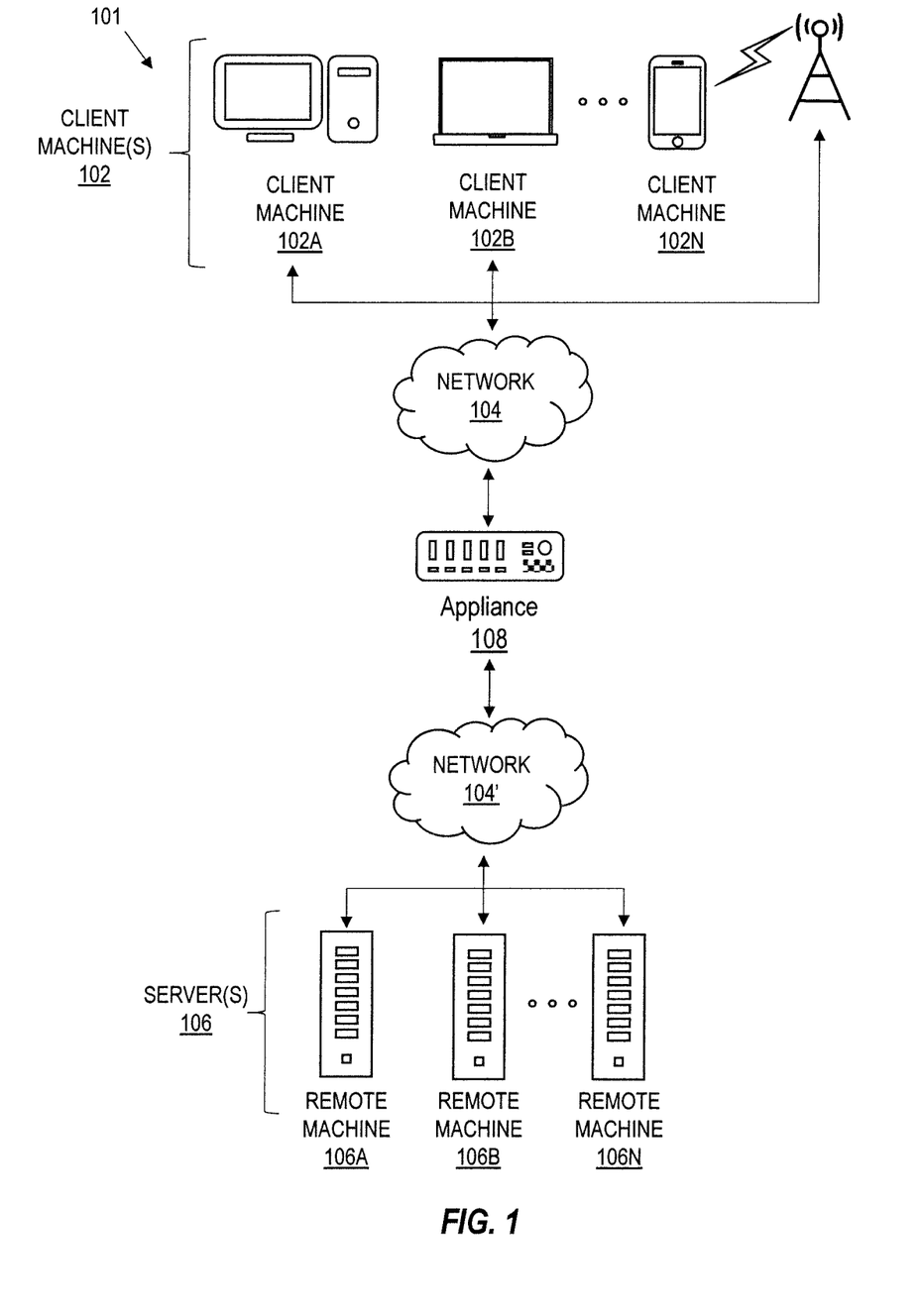
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ACTIVEX control; a JAVA applet; software related to voice over internet protocol (VoIP) communications like a soft IP telephone; an application for streaming video and/or audio; an application for facilitating real-time-data communications; a HTTP client; a FTP client; an OSCAR client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, BLUETOOTH, and Near Field Communication (NFC).

Figure 2:
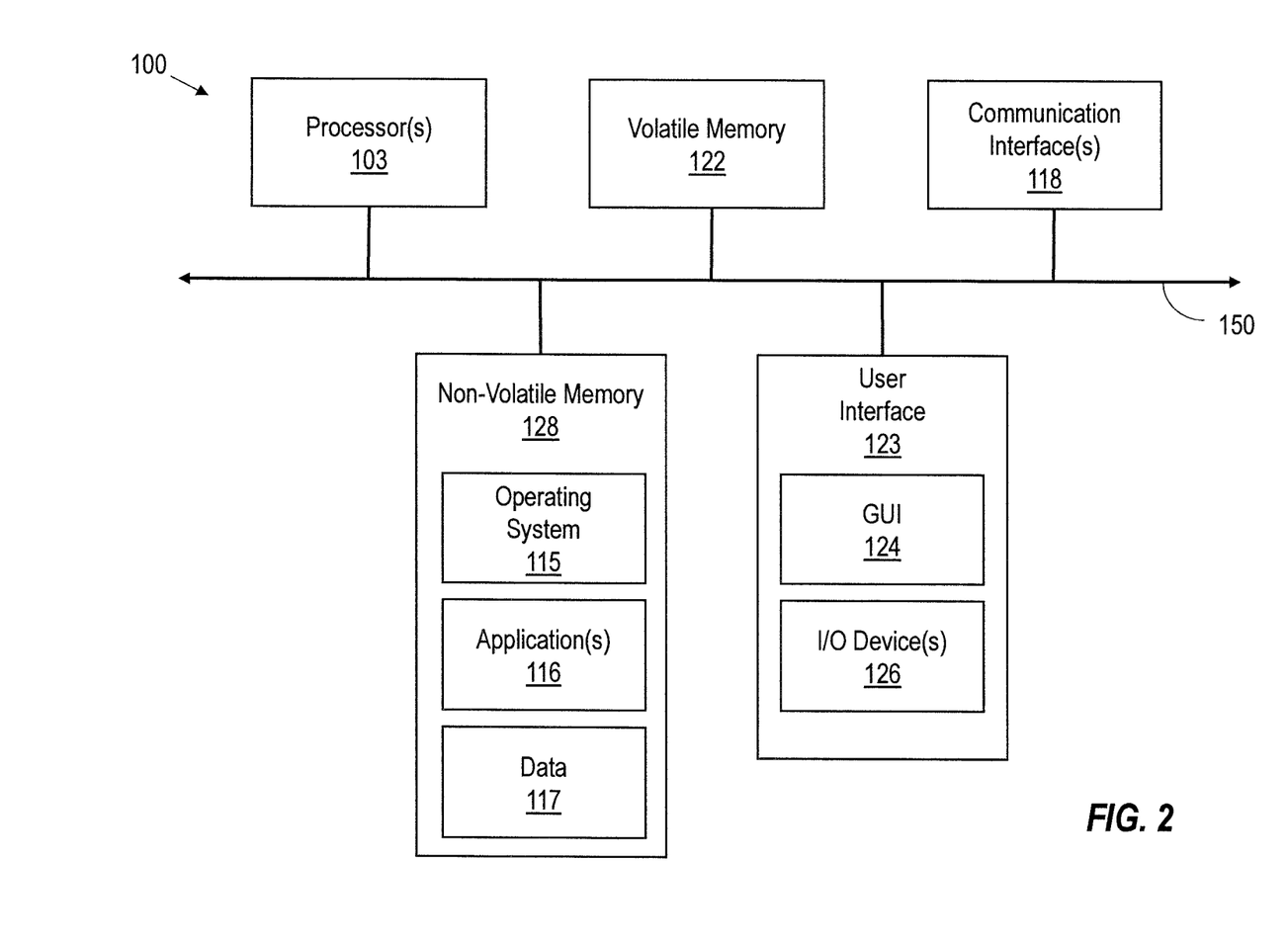
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
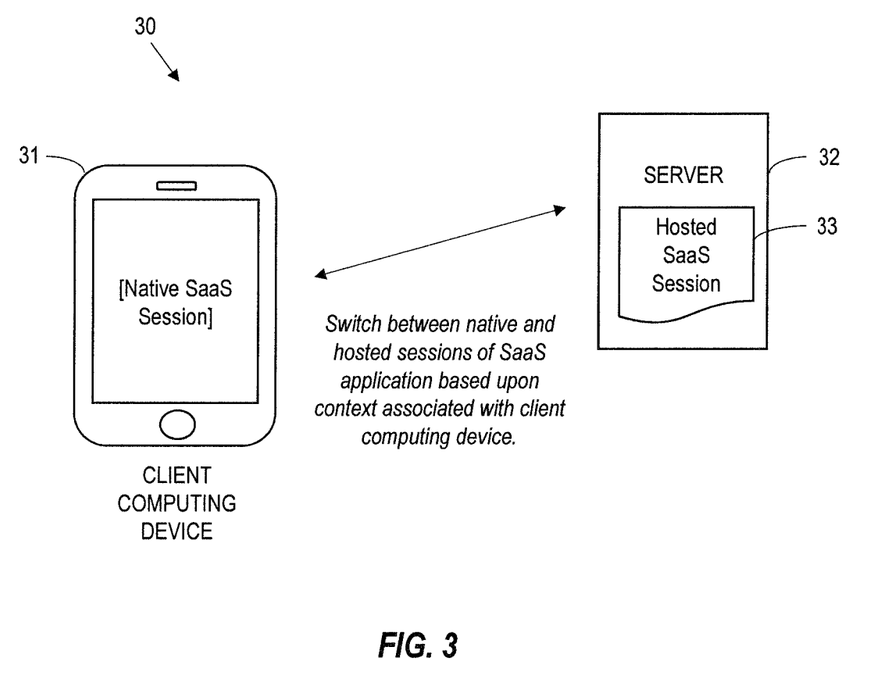
FIG. 3 is a block diagram of a computing system providing Software as a Service (SaaS) application session switching between native and hosted SaaS application sessions in accordance with an example embodiment.

Turning now to FIG. 3, a computing system 30 which advantageously provides Software as a Service (SaaS) application session migration is first described. The system 30 illustratively includes one or more client computing devices 31 and one or more servers 32. By way of example, the client computing device 31 may be a desktop computer, laptop computer, tablet computer, smartphone, etc. The client computing device 31 may run SaaS application sessions in different ways. One is to run a hosted SaaS application session 33 from the server 32 via a hosted browser, for example. However, another approach is to run a native (aka mobile) SaaS application session at the client computing device 31, which may be more convenient than an embedded browser albeit with potentially reduced functionality than is available in the hosted SaaS application session 33.

By way of example, the computer system 30 may be implemented as a unified endpoint management (UEM) system in which the server 32 provides for an enterprise to exercise centralized control of client computing devices 31. It should be noted that other configurations of the system 30 are also possible, such as an enterprise mobility management (EMM) configuration, for example. In such implementations, the server 32 allows for the enforcement of data loss prevention (DLP) and/or other security policies for user access to various applications and data, and in some instances may be implemented in conjunction with a mobile device management (MDM) agent installed on the client computing device 31. Also, the system 30 may utilize a mobile application management (MAM) approach, which provides enterprise control at the application level for managing and securing application data without installing an agent on the client computing device 31. In accordance with one example implementation, the server 32 may be implemented as part of a CITRIX Workspace implementation in combination with CITRIX NETSCALER Secure Web Gateway to provide SaaS application access as discussed further below, but it will be appreciated that other systems and platforms may be used in different embodiments.

Generally speaking, a native SaaS application is one that runs on a client computing device and communicates directly with a target host (e.g., a SaaS server) via the Internet. In some cases, the native SaaS application may operate within a managed framework (e.g., UEM/EMM), which provides access to the Internet and/or enterprise resources in accordance with certain rules and permission levels, as noted above. A hosted SaaS application session is run remotely on a cloud or network server 32, such as in a virtual computing session, and displayed locally at the client computing device 31. By way of example, this may be done via a hosted browser such as those provided through the CITRIX Secure Browser Standard Service. However, it will be appreciated that other forms of managed and hosted browsers may be used in different embodiments.

Generally speaking, the present approach allows the client computing device 31 and the server 32 to advantageously cooperate to switch between a native session of the SaaS application and the hosted session of the SaaS application 33 based upon a context associated with the client computing device 31. The context associated with the client computing device 31 may generally pertain to how the SaaS application is being used, metrics associated with the SaaS application sessions, where the client computing device 31 is being used, etc. The client computing device 31 and/or the server 32 may dynamically or automatically transition between the different sessions of the same SaaS application based upon changes in one of more of these contextual parameters, and in some implementations in a transparent fashion (i.e., unbeknownst to the user). In some embodiments, the user may also be prompted to approve a switch before it occurs, if desired.

Figure 4:
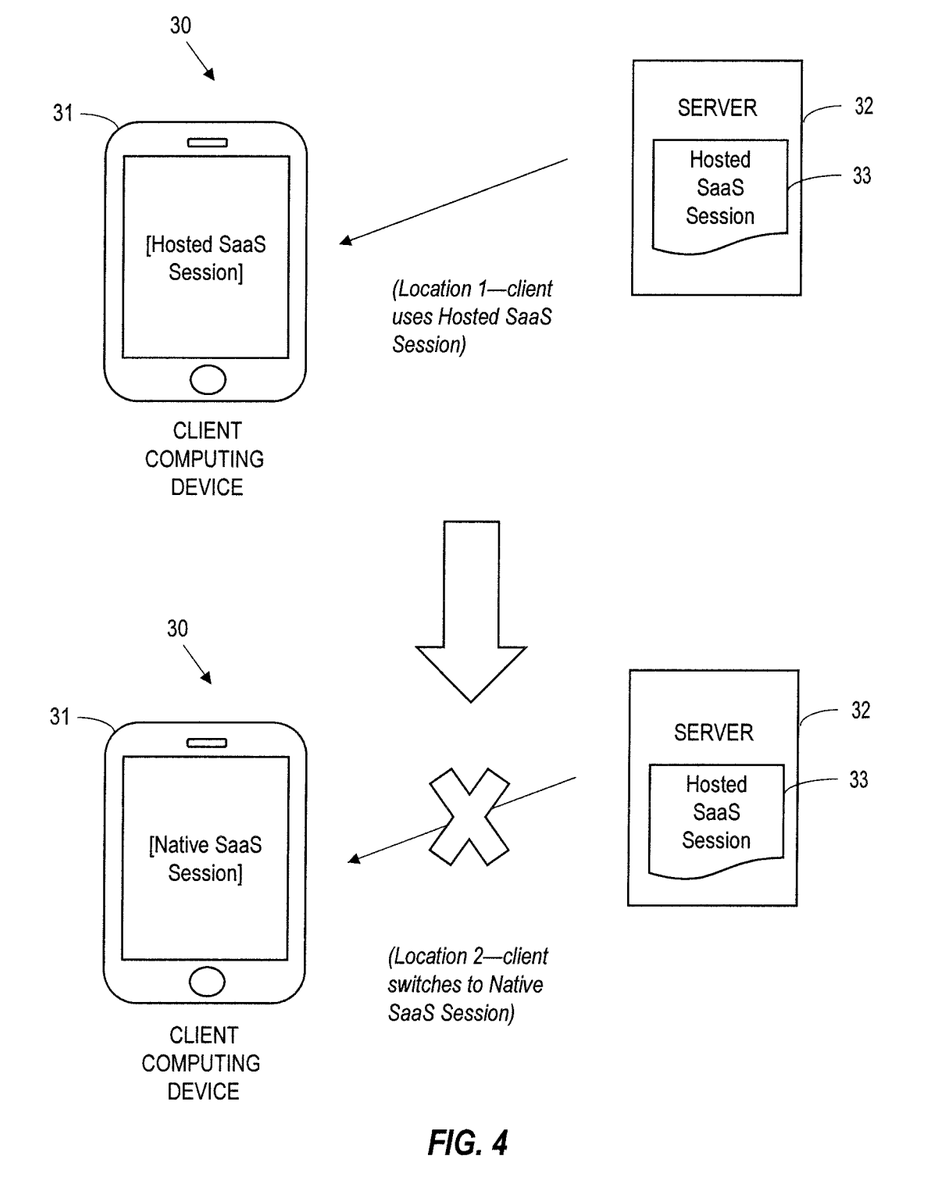
FIG. 4 is a block diagram of an example implementation of the computing system of FIG. 3 illustrating switching between native and hosted SaaS application sessions based upon a location associated with the client computing device.

In one example implementation now discussed with reference to FIG. 4, the context associated with the client computing device 31 may correspond to a location of the client computing device. In the illustrated example, at a first time the client computing device is at a first location (Location 1) where it is using the hosted SaaS application session 33 provided by the server 32. However, upon transitioning to a second location (Location 2), the client computing device 31 cooperates with the server 32 to transition or switch to the native SaaS application session. By way of example, if the client computing device 31 is at a work location, then the client computing device may switch to the hosted SaaS application session 33, and when the client computing device leaves the vicinity of the work location then it switches to the native SaaS application session. It will be appreciated that various other locational triggers may be used in different implementations.

Figure 5:
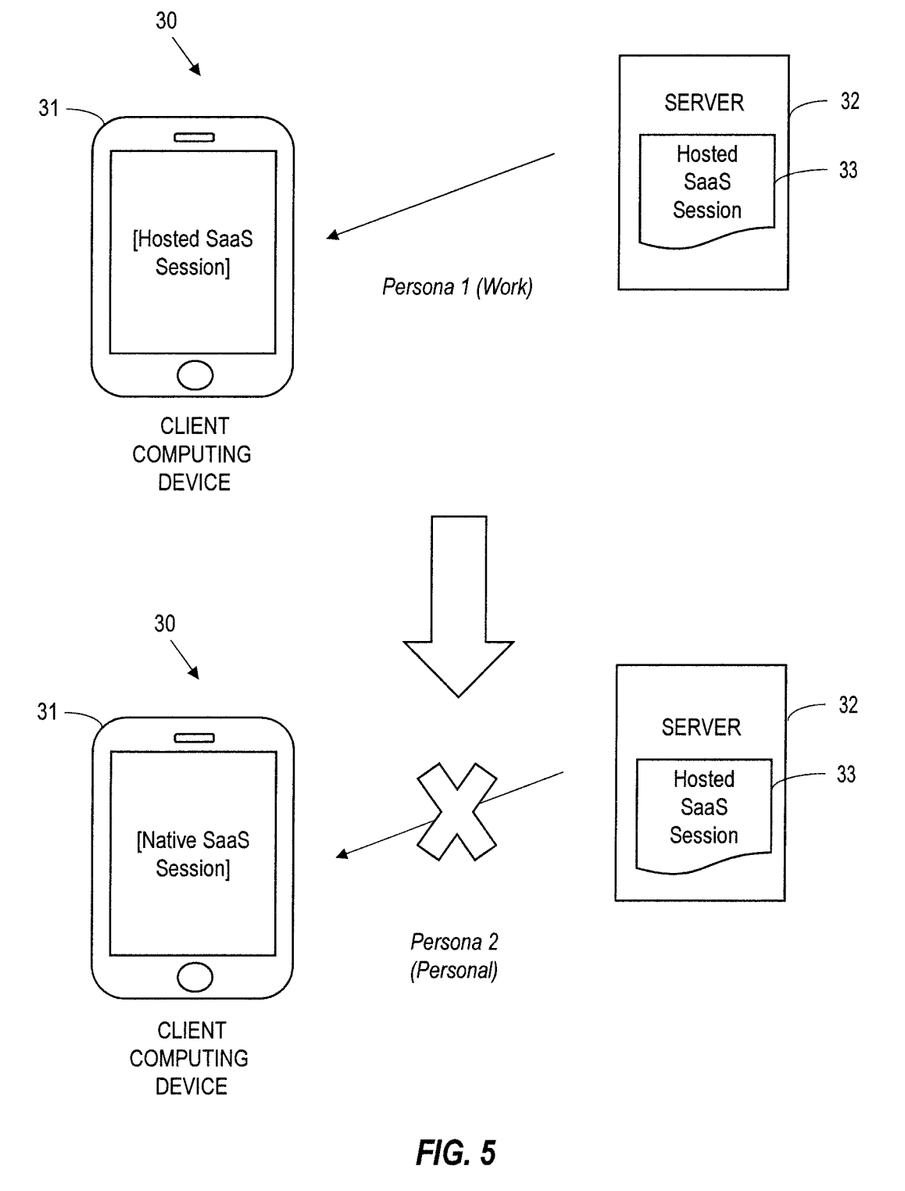
FIG. 5 is a block diagram of an example implementation of the computing system of FIG. 3 illustrating switching between native and hosted SaaS application sessions based upon different user personas.

In accordance with another example embodiment now described with reference to FIG. 5, the client computing device 31 may be associated with a user account having a plurality of different personas, such as a work persona and a personal/home persona, for example. As such, in this case the context used for switching between hosted and native SaaS application sessions may correspond to which of the different user personas is currently active. In the present example, when the work persona is active (e.g., the user has logged onto their enterprise account) then the hosted SaaS session is used. However, when the work persona is no longer active (e.g., the client computing device 31 is logged off of the enterprise account), then a transition to the native SaaS session occurs as shown. Of course, other personas and session switching arrangements may be used in different embodiments.

Figure 6A:
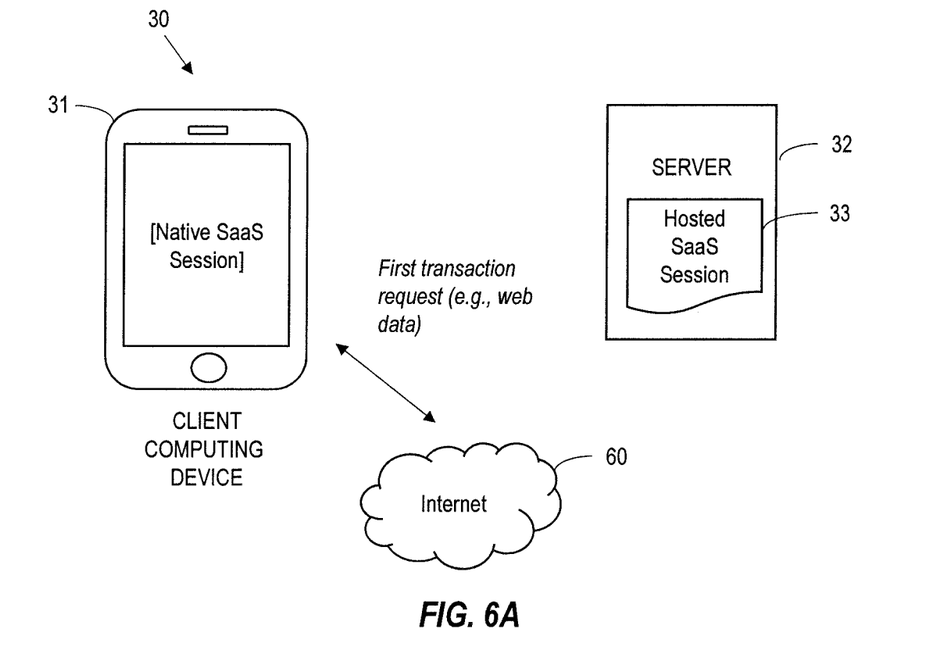
FIGS. 6A-6B are block diagrams of an example implementation of the computing system of FIG. 3 illustrating switching between native and hosted SaaS application sessions based upon different transaction request types.
Figure 6B:
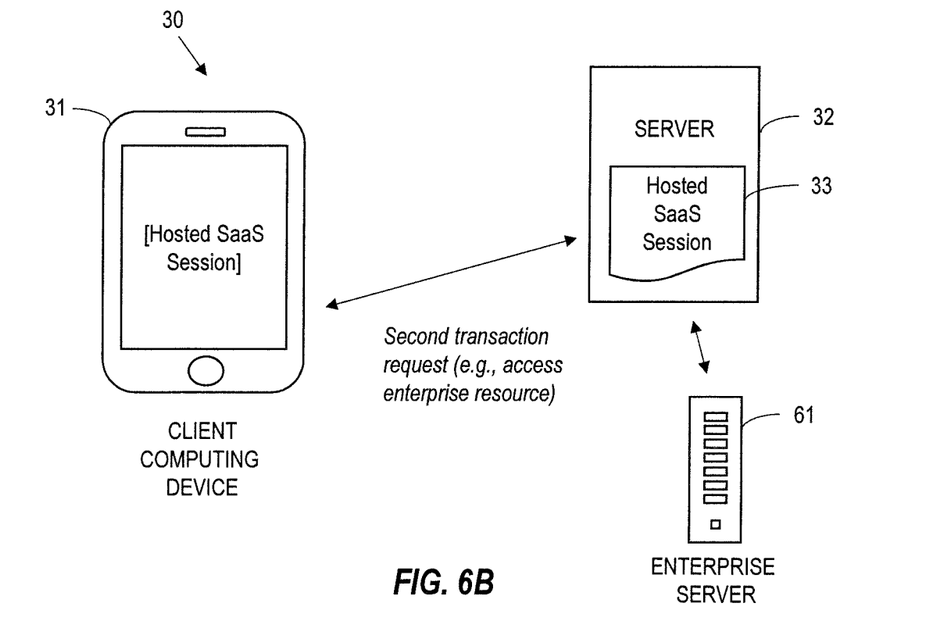

Still another context example is now described with reference to FIGS. 6A-6B. Here, the context corresponds to a type of transaction requested by the SaaS application. In the illustrated example the native SaaS application session is initially being used by the client computing device 31 and is requesting publicly available data from the internet 60 (FIG. 6A). However, when a second request is made for secure enterprise resources (e.g., access to a corporate database, etc., from an enterprise server 61), this change in context results in a switch to the hosted SaaS application session 33 which may interface with an enterprise server 61 for retrieving the secure enterprise data. Various other types of transaction requests may be used to trigger SaaS application session switching as well.

Figure 7A:
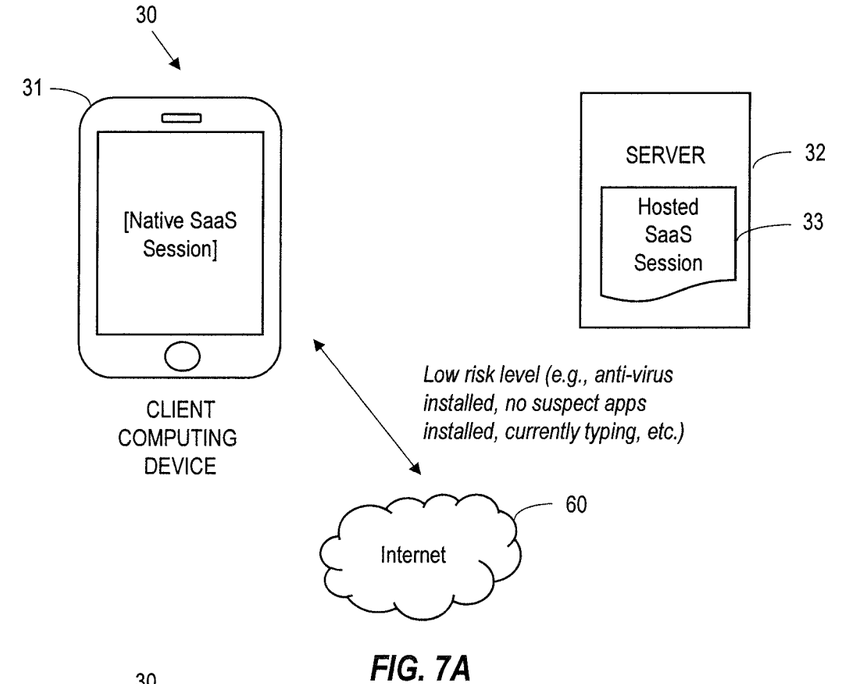
FIGS. 7A-7B are block diagrams of an example implementation of the computing system of FIG. 3 illustrating switching between native and hosted SaaS application sessions based upon different security risk levels.
Figure 7B:
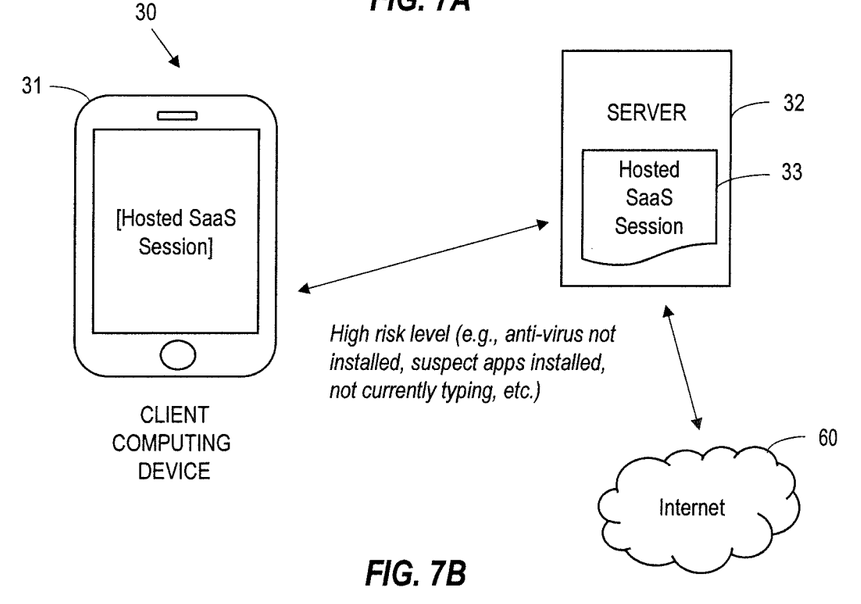

In still further implementations now described with reference to FIGS. 7A-7B, the context may correspond to a security risk level. In the illustrated example, the native SaaS application session is used by the client computing device 31 when a relatively low security risk level is determined, allowing the client computing device 31 to directly communicate via the internet 60. For example, the risk level may be low when the client computing device 31 has appropriate anti-virus software installed and running. Another risk level factor may be whether the client computing device has any suspect applications installed/running which are known security risks. Still another risk level factor may be whether the client computing device 31 is being attended by the user or is unattended, which may be determined based upon the keyboard (e.g., whether the user is actively typing), camera, etc.

On the other hand, when it is determined that there is a higher risk level based upon one or more of these (or other) security factors, then the client computing device 31 may accordingly switch to the hosted SaaS application session 33, which may then handle internet 60 communications, etc., through its more robust security interface. In the example implementation using CITRIX Workspace, this framework allows for the collection of telemetry related to such security factors, although other approaches or systems may be used as well.

Figure 8:
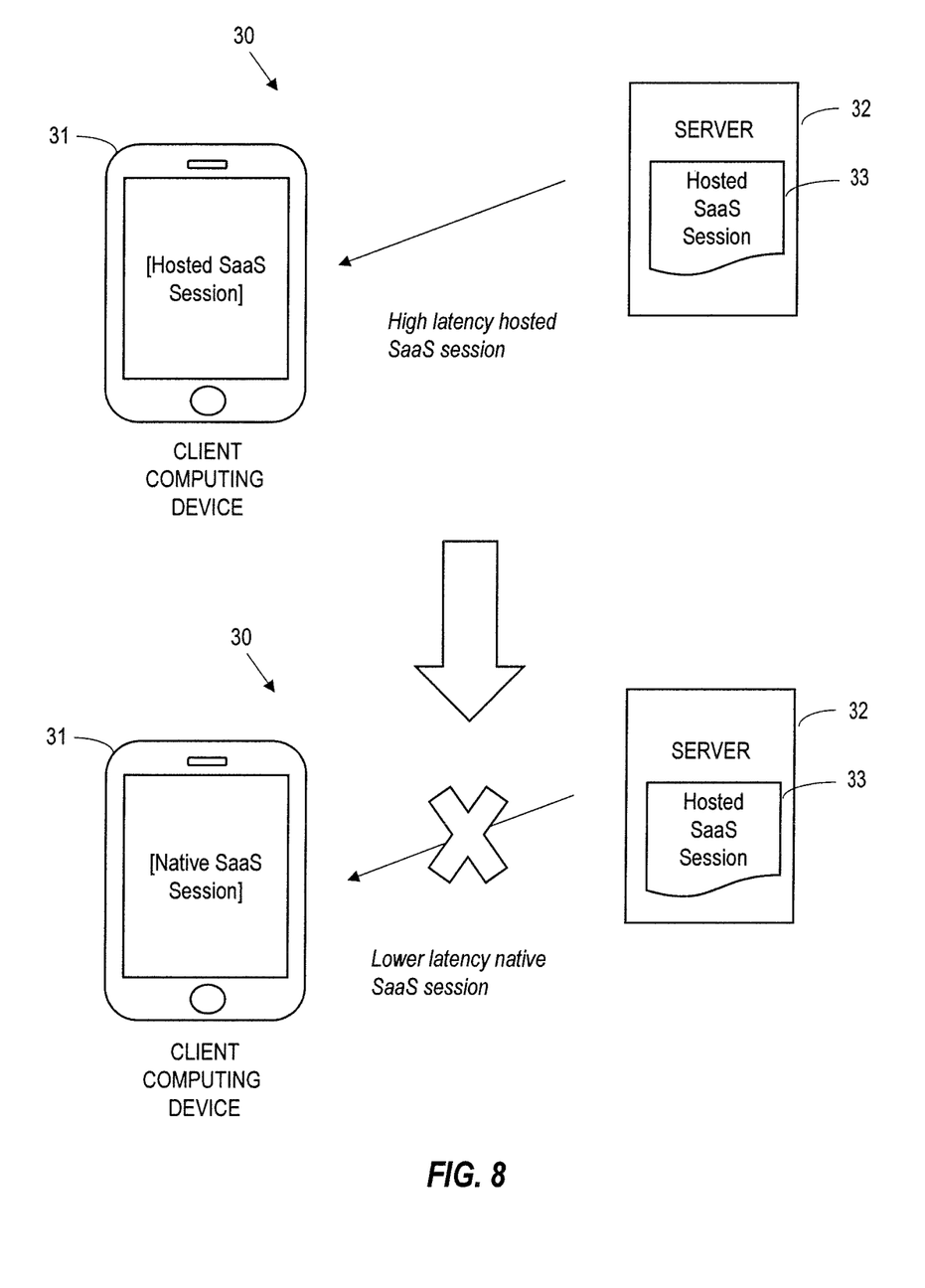
FIG. 8 is a block diagram of an example implementation of the computing system of FIG. 3 illustrating switching between native and hosted SaaS application sessions based upon latency.

In still another example now described with reference to FIG. 8, the context associated with the client computing device may correspond to a latency associated with the hosted session of the SaaS application. In the illustrated example, the client computing device 31 is initially running the hosted SaaS application session 33 from the server 32, but for some reason the hosted SaaS application session is subject to a relatively high latency (e.g., above a desired threshold). As a result, the client computing device cooperates with the server 32 to switch to the native SaaS application session, which has a lower latency associated therewith. However, it should be noted that the switching could also go the other way (i.e., from native to hosted) should the latency associated with the native SaaS application session exceed a latency threshold, for example.

It should also be noted that, in some implementations, when the latency crosses the desired threshold this may override a security protocol that would otherwise prohibit use of one session or the other. That is, this embodiment may be combined with the embodiment described with respect to FIGS. 7A-7B, such that security policy may ordinarily dictate which session is to be used until the latency of that session crosses the latency threshold, meaning the default session from a security perspective would otherwise be problematic from a UX perspective, and a switch to the other SaaS application session would then be performed. It should also be noted that other embodiments described herein may similarly be used in conjunction in various implementations, e.g., one context trigger provides for a default configuration and another context trigger results in a change to the default configuration, or in other cases multiple contextual triggers may be required before a change in SaaS application sessions occurs.

Figure 9:
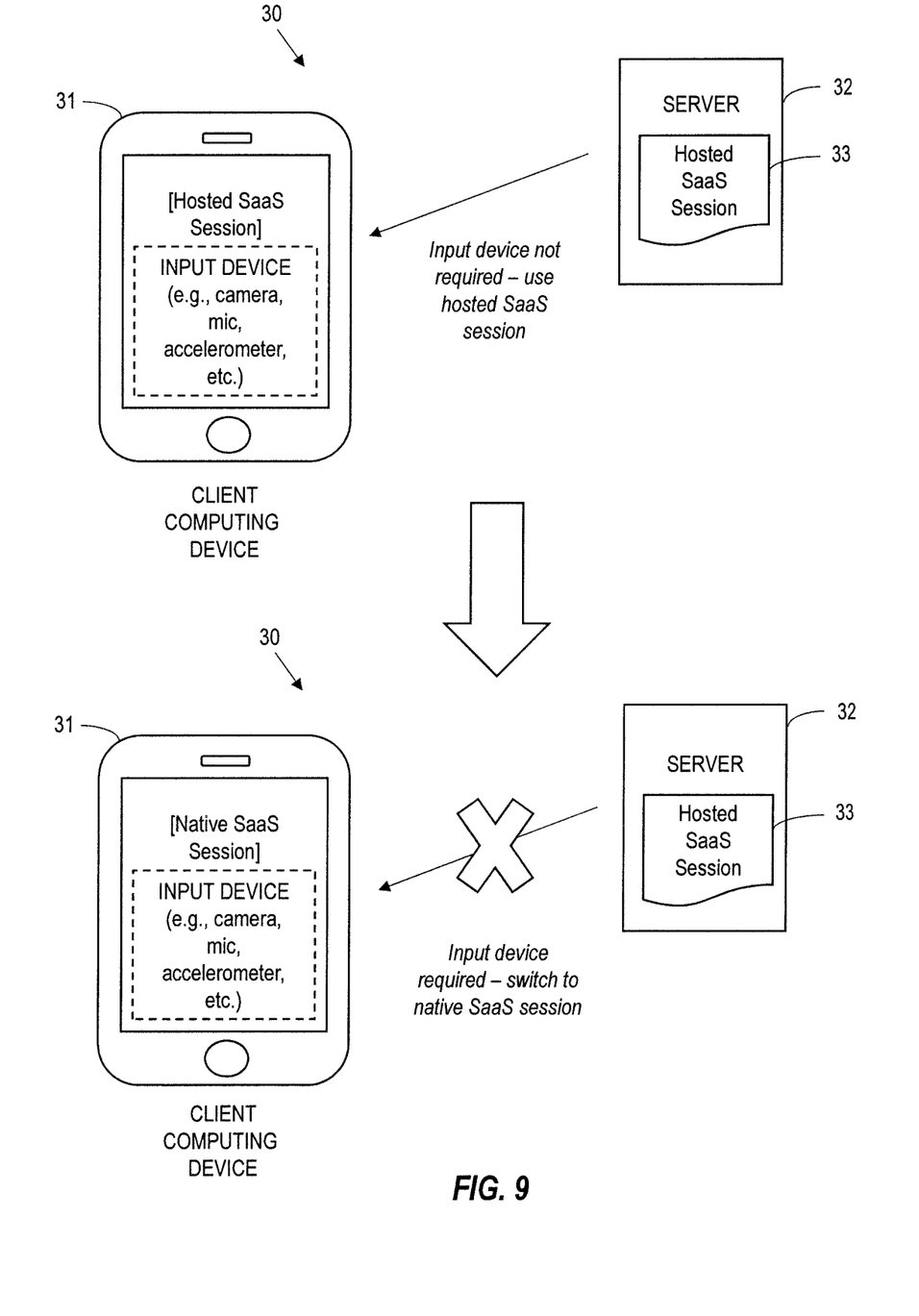
FIG. 9 is a block diagram of an example implementation of the computing system of FIG. 3 illustrating switching between native and hosted SaaS application sessions based upon a call to use an input device associated with the client computing device.

In still another example now discussed with reference to FIG. 9, the client computing device may include one or more input devices 90, such as a camera, microphone, accelerometer, etc. Moreover, the context associated with the client computing device 31 may correspond to a call to use the input device(s) 90 by the SaaS application. For example, a SaaS application for submitting corporate expense reports may in some circumstances require a picture of a receipt, at which point the client computing device 31 may switch from the hosted SaaS application session 33 to the native SaaS application session which has the ability to locally control the input device 90, whereas the hosted SaaS application session does not. A switch back to the hosted SaaS application session 33 may occur when the input device 90 is no longer needed or being used, if desired.

Figure 10:
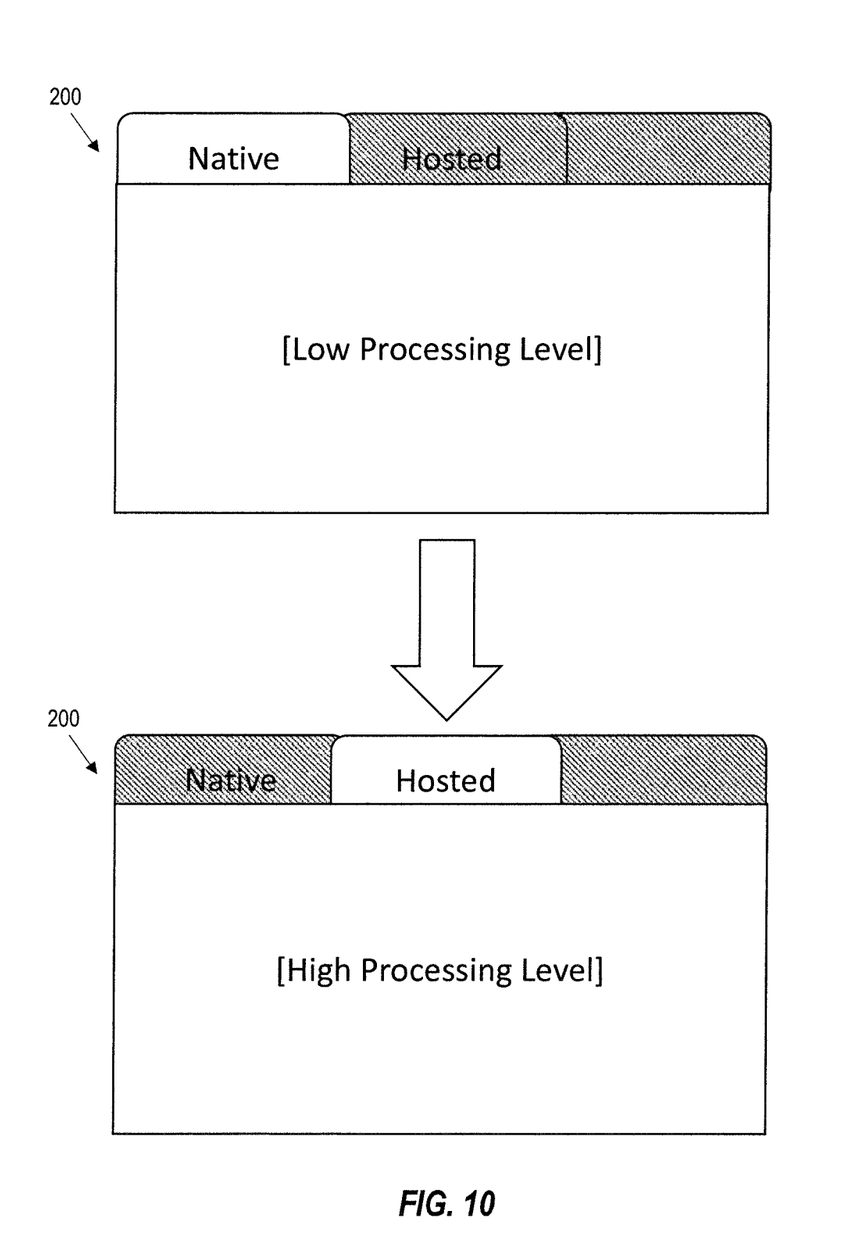
FIG. 10 is a series of front views of a display screen of the client computing device of FIG. 3 illustrating an example implementation of switching between native and hosted SaaS application sessions based upon a processing level associated with an operation being performed by the SaaS application.

Yet another example is now described with reference to FIG. 10, in which the context associated with the client computing device 31 corresponds to a processing level associated with an operation being performed by the SaaS application. That is, more extensive or computationally intensive operations may be performed by the hosted SaaS application session 33, and vice-versa. In this example, a display 200 of the client computing device 31 is shown in which a tab view of both the native and hosted SaaS application sessions is provided, and the user is permitted to select between them through the user interface by clicking on the appropriate tab. Here, the tab for the native SaaS application session is initially selected, but when a complex or lengthy processing operation is required the user clicks the hosted SaaS application session tab to thereby switch to the hosted SaaS application session. This approach advantageously provides for native SaaS application offloading of more complex workflows to a web-based SaaS application session, while the hosted SaaS application session operates silently in the background.

It should be noted that the above-described multi-tab view need not be used for switching between the hosted and native SaaS application sessions in all embodiments, i.e., it may be done automatically as discussed above. Furthermore, the above-described embodiments may also be implemented using the tab view user interface shown in FIG. 10 as well, if desired.

Figure 11:
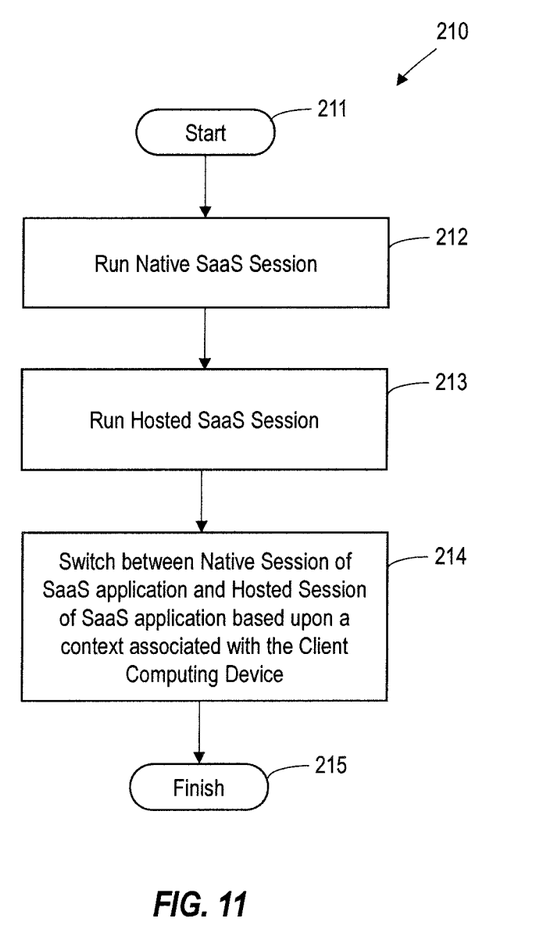
FIG. 11 is a block diagram illustrating example method aspects associated with the computing system of FIG. 3.

Related method aspects are now described with reference to the flow diagram 210 of FIG. 11. Beginning at Block 211, the native session of the SaaS application is run at the client computing device 31, and the hosted session of the SaaS application 33 for the client computing device 31 is run at the server 32, at Blocks 212-213. The method further illustratively includes switching between the native session of the SaaS application and the hosted session 33 of the SaaS application based upon a context associated with the client computing device 31, at Block 214, as discussed further above. The method of FIG. 11 illustratively concludes at Block 215.

The above-described approach advantageously provides for a dynamic and optionally automatic transition between various hosts or versions of SaaS application sessions depending on context changes. In a managed access environment (e.g., UEM/EEM), changes in context may be determined based upon request/response recording using "hooks" into the application's network layer. As a result, implementations discussed above advantageously provide for an improved virtual computing environment with dynamic switching between different SaaS application sessions to accommodate the current context in which a given client computing device is operating.

Further details regarding determining client computing device context, and techniques for transitioning between different SaaS application sessions, may be found in co-pending application Ser. Nos. 15/971,157 and 16/156,256. These applications are also assigned to the present Applicant and are both hereby incorporated herein in their entireties by reference.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computer system comprising:
    a client computing device configured to open, at the client computing device, a native session of a Software as a Service (SaaS) application with a target host; and
    a server configured to open, at the server, a hosted session of the same SaaS application running in the native session with the target host for the client computing device and while the native session is also running;
    wherein the client computing device and the server cooperate to switch between displaying the native session of the SaaS application at the client computing device and remotely displaying the hosted session of the SaaS application from the server at the client computing device based upon a context associated with the client computing device.

2. The computer system of claim 1 wherein the context associated with the client computing device corresponds to a location of the client computing device.

3. The computer system of claim 1 wherein the client computing device is associated with a user account having a plurality of different personas, and wherein the context associated with the client computing device corresponds to an active persona from among the plurality of different personas.

4. The computer system of claim 1 wherein the context associated with the client computing device corresponds to a type of transaction requested by the SaaS application.

5. The computer system of claim 1 wherein the context associated with the client computing device corresponds to a security risk level associated with an operation being performed by the SaaS application.

6. The computer system of claim 1 wherein the context associated with the client computing device corresponds to a latency associated with the hosted session of the SaaS application.

7. The computer system of claim 1 wherein the client computing device comprises at least one input device; and wherein the context associated with the client computing device corresponds to a call to use the at least one input device by the SaaS application.

8. The computer system of claim 7 wherein the at least one input device comprises at least one of a camera, a microphone, and an accelerometer.

9. The computer system of claim 1 wherein the context associated with the client computing device corresponds to a processing level associated with an operation being performed by the SaaS application.

10. A method comprising:
    opening a native session of a Software as a Service (SaaS) application with a target host at a client computing device;
    opening, at a server, a hosted session of the same SaaS application running in the native session with the target host for the client computing device and while the native session is also running; and switching between displaying the native session of the SaaS application at the client computing device and remotely displaying the hosted session of the SaaS application from the server at the client computing device based upon a context associated with the client computing device.

11. The method of claim 10 wherein the context associated with the client computing device corresponds to a location of the client computing device.

12. The method of claim 10 wherein the client computing device is associated with a user account having a plurality of different personas, and wherein the context associated with the client computing device corresponds to an active persona from among the plurality of different personas.

13. The method of claim 10 wherein the context associated with the client computing device corresponds to a type of transaction requested by the SaaS application.

14. The method of claim 10 wherein the context associated with the client computing device corresponds to a security risk level associated with an operation being performed by the SaaS application.

15. The method of claim 10 wherein the context associated with the client computing device corresponds to a latency associated with the hosted session of the SaaS application.

16. The method of claim 10 wherein the client computing device comprises at least one input device; and wherein the context associated with the client computing device corresponds to a call to use the at least one input device by the SaaS application.

17. A method comprising:
opening a native session of a Software as a Service (SaaS) application with a target host at a client computing device comprising at least one input device; and
opening, at a server, a hosted session of the same SaaS application running in the native session with the target host for the client computing device and while the native session is also running;
switching to displaying the native session of the SaaS application at the client computing device based upon a call to use the at least one input device by the SaaS application, and switching to remotely displaying the hosted session of the SaaS application from the server at the client computing device based upon a processing level associated with an operation being performed by the SaaS application being above a threshold level.

18. The method of claim 17 further comprising switching between the native session of the SaaS application and the hosted session of the SaaS application based upon a location of the client computing device.

19. The method of claim 17 further comprising switching between the native session of the SaaS application and the hosted session of the SaaS application based upon a type of transaction requested by the SaaS application.

20. The method of claim 17 further comprising switching between the native session of the SaaS application and the hosted session of the SaaS application based upon a security risk level associated with an operation being performed by the SaaS application.

* * * * *